US010284660B1

(12) United States Patent
Nene

(10) Patent No.: US 10,284,660 B1
(45) Date of Patent: May 7, 2019

(54) DATA FLOW TOKENS TO TRACE EXECUTION OF SERVICES IN A SERVICE PROVIDER NETWORK

(71) Applicant: AMAZON TECHNOLOGIES, INC., Seattle, WA (US)

(72) Inventor: Bhushan Sharad Nene, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 258 days.

(21) Appl. No.: 15/069,374

(22) Filed: Mar. 14, 2016

(51) Int. Cl.
*H04L 29/08* (2006.01)
*H04L 12/26* (2006.01)
*H04L 12/24* (2006.01)

(52) U.S. Cl.
CPC .......... *H04L 67/16* (2013.01); *H04L 41/5048* (2013.01); *H04L 43/0876* (2013.01)

(58) Field of Classification Search
CPC ...................................................... H04L 67/16

USPC ........................................................ 709/224
See application file for complete search history.

(56) References Cited

U.S. PATENT DOCUMENTS 7,843,843 B1 * 11/2010 Papp, III .............. H04L 41/5009
370/252

* cited by examiner

*Primary Examiner* — Adnan M Mirza
(74) *Attorney, Agent, or Firm* — Blank Rome LLP

(57) ABSTRACT

A service provider network offers various services to users. Some of the services may be stateless services. Data flow tokens may be generated and embedded in packets that are provided to the various services. A data flow token uniquely identifies the data flow for a set of services that are invoked by, for example, an application programming interface (API) call to the service provider network. The various services that are invoked as part of a common data flow write diagnostics data to a diagnostics log service. The diagnostics data may include the data flow token as well as a time stamp when the service was invoked and a time stamp when the service completes. The time stamps can be used to determine the period of time that the service took to execute. Analysis of the execution times can assist in, for example, auto-scaling the services for better performance.

21 Claims, 5 Drawing Sheets

DATA FLOW TOKENS TO TRACE EXECUTION OF SERVICES IN A SERVICE PROVIDER NETWORK

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide "full service" facilities that include hardware and software resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine (e.g., a server) to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Some services offered by service providers are provided on serverless architectures. A stateless service is a service that does not maintain the state of a transaction after completion of the transaction. In some examples, all input parameters needed by a stateless service are contained in the input packet to the service to initiate an operation. Once the operation is complete, no data, metadata, etc. is stored by the service related to the completed operation. An architecture in which such services execute may be referred to as a "serverless architecture."

An advantage of a server-less architecture is that it obviates the need for managing virtual machines and software stacks. Unfortunately, having a service provider host an application without requiring management of virtual machines and software stacks also makes it difficult by the application developer to debug and diagnose problems with an application.

BRIEF DESCRIPTION OF THE DRAWINGS

For a detailed description of various examples, reference will now be made to the accompanying drawings in which.

DETAILED DESCRIPTION

Figure 1:
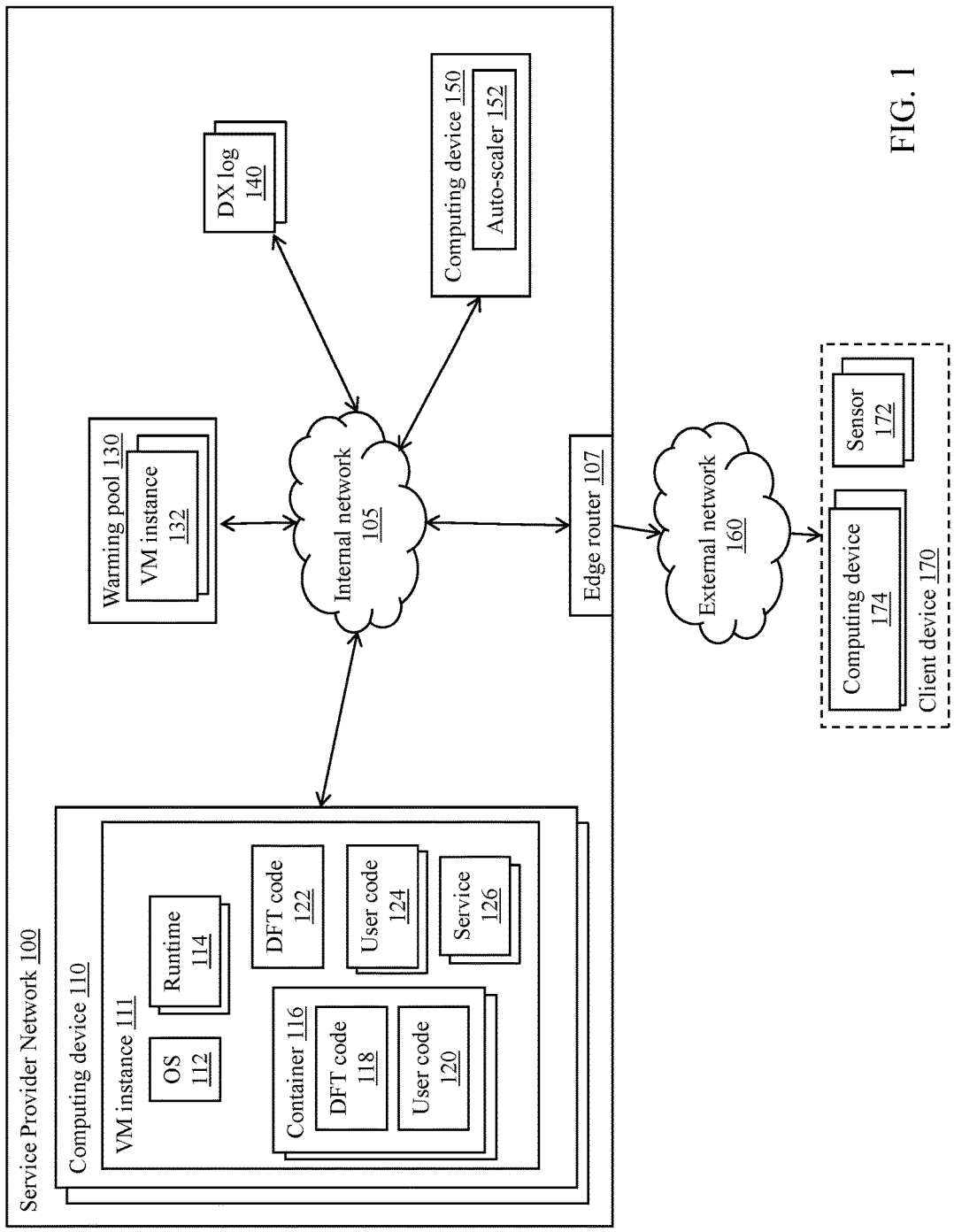
FIG. 1 shows a diagram of a system in which data flow tokens are used to track data flow in a service provider network in accordance with various examples.

In accordance with various embodiments, a service provider network offers services to users of the service provider. Some or all of the services may be implemented on serverless architectures of the service provider network in which developers generally do not have access to the control and management of the underlying virtual machines. The services may be used by the customer in a hierarchical fashion. That is, a top-level service may receive an invocation request for a particular operation to be performed, and the top-level service may send a request to a lower-level service to perform part of the desired operation. The lower-level service may initiate a call to a further downstream service to perform a part of the desired operation, and so on. The invocation request received by the top-level service may be an application programming interface (API) call or other form of a request. The reaction of the various services to the API call to generate downstream requests through the service hierarchy to perform the various operations of the API call is referred to as a "data flow." Thus, an API call may be generated and received by a top-level service, which then initiates one or more calls to downstream services as part of a data flow associated with the invocation API call.

In some embodiments, at a network level each service may be capable of analyzing a header of an incoming request to determine whether the header includes a data flow token (DFT). A data flow token may be an immutable identifier that universally unique identifies a particular data flow. Each data flow thus is assigned its own data flow token. The data flow tokens may be generated by a network stack protocol as one service sends a packet to another service as part of a data flow. When a service in the data flow receives a packet from another service, the receiving service determines whether a header of the incoming packet includes a data flow token. If no data flow token is detected, the receiving service generates a data flow token for that data flow and embeds the data flow token in any packet that the receiving service sends another service as part of the data flow. If the receiving service detects that a data flow token is present in the received packet, then the data flow token is extracted from the packet.

In either case (packet includes a data flow token which is extracted, or packet did not include a data flow token thereby requiring generation of the data flow token), the receiving service causes an entry to be added to a diagnostics log service. The diagnostics log service may include a separate diagnostics log for each of the services. The entry added to a respective service's diagnostics log may include the data flow token. A time stamp also may be included in the diagnostics log entry. The time stamp may be generated by the service that receive the packet and extracted the data flow token from the packet (or generated the token). The time stamp corresponds to the time that the service received the packet. Upon completion of its operation, the service updates the entry in its diagnostic log (or adds another entry) with another time stamp indicate of when the service completed its operation. The difference between the two time stamps provides a measure of the amount of time the service took to complete its operation. As each service within a given data flow adds a time stamp to its respective diagnostics log of when it received a packet, data flow tokens and the time stamps can be used to recreate a data flow. That is, the particular sequence of services that were executed during the data flow can be determined.

The diagnostics logs can be analyzed for any of a variety of reasons such as debugging. For example, by recreating the sequence of services of a given data flow, it can be determined whether any services executed in an incorrect order, or whether a fault occurred within the call chain that eventually caused a failure in the top-level service. Further, the time stamp data can be used to determine how long each service within a data flow took to execute. If the execution time of a particular service in a data flow is longer than a predetermined threshold, a performance parameter of that particular service can be adjusted to enable the service to perform faster. In some examples, the total time it takes to complete the operation(s) of an invocation API call may need to be no greater than a time period specified by a service level agreement (SLA). If a given API call takes longer to execute than the SLA specified time period, then the system can analyze the time periods of the data flow's constituent services to determine which service to tune for better performance.

In some embodiments, the service provider network may include asynchronous data processing architecture patterns that are based on polling and data change triggers or events, where data may be held for an arbitrary period of time before continuing on to the next execution of the data flow. An example of such a service may be a storage service or streaming service, but numerous other examples exist as well. A storage service may store a data object and then trigger an event for a further operation to be performed on the data object. The storage service may generate a data flow token for the received data object, if the packet containing the incoming data object does not already have a data flow token, and store the data flow token along with the data object. For example, the data flow token may be stored as a metadata property. Further, the event generated by the service may include the data flow token within the event itself (e.g., a JavaScript Object Notation ("JSON")) object.

FIG. 1 shows an example of a service provider network 100 in accordance with various embodiments. The service provider network 100 includes multiple computing devices 110 and 150, a warming pool 140, diagnostics (DX) logs 140, and an edge router 107 coupled together by way of an internal network 105.

The computing devices 110 may include the same or different types of computers such as server computers (servers). Each computing device 110 is a hardware device that may include one or more processors, volatile memory (e.g., random access memory), and non-volatile storage (e.g., hard drive, solid-state storage, etc.) which include machine instructions that, when executed by the processor(s), cause some or all of the functionality described herein to be performed.

The internal network 105 may include a combination of routers, switches and other types of networking devices over which the computing devices 110 and 150, warming pool 130, diagnostics logs 140 and edge router 107 communicate with one another. The edge router 107 provides connectivity to the service provider network 100 on behalf of one or more client devices 170. The client devices 170 can access the service provider network 100 through an external network 160. The external network 160 may be any wired network, wireless network, or combination thereof. The external network 160 may be a personal area network, local area network, wide area network, over-the-air broadcast network, cable network, satellite network, cellular telephone network, or any combination of such networks. For example, the external network 160 may be a publicly accessible network of linked networks, possibly operated by various distinct parties, such as the Internet. In some embodiments, the external network 160 may be a private or semi-private network, such as a corporate or university intranet. The network 160 may include one or more wireless networks, such as a Global System for Mobile Communications (GSM) network, a Code Division Multiple Access (CDMA) network, a Long Term Evolution (LTE) network, or any other type of wireless network. The network 160 can use protocols and components for communicating via the Internet or any of the other aforementioned types of networks. For example, the protocols used by the network 160 may include Hypertext Transfer Protocol (HTTP), HTTP Secure (HTTPS), Message Queue Telemetry Transport (MQTT), Constrained Application Protocol (CoAP), and the like.

The client devices 170 may include different types of devices such as sensors 172 and computing device 174. The sensors 172 may include Internet-of-Things (IoT) sensor devices such as Internet appliances and connected devices. The computing devices 174 may include desktop computers, laptop computers, mobile phones, tablet devices, terminal computing devices, etc.

Referring still to FIG. 1, each computing device 110 may execute one or more virtual machine (VM) instances 111. Each virtual machine instance is assigned to a user of the service provider, and multiple virtual machine instances may be assigned to the same user or to a particular group of users (e.g., a user security group based on security credentials). Each virtual machine instances 111 has an operating system (OS) 112 and one or more execution language runtimes 114, and may include one or more containers 116. A user may load or cause to be loaded user code 120 in a container assigned to that user. The user code may be custom code of that user and performs whatever functionality the user desires. For some users, the user code 120 may be run within a container on a virtual machine instance 111, while for other users, user code 124 may execute on a virtual machine instance 111 but not within a container 116. Some computing devices 110 may execute virtual machine instances 111, while other computing device 110 may not execute virtual machine instances. Some computing devices 110 may be used to execute user code 120, 124. These or other computing devices 110 may be used to execute various services 126 provided by the service provider for use by the users. The services 126 may include any of a variety of services such as database services, streaming services, API gateway services, etc. One of the services 126, for example, may permit a user to upload and have his user code 124 executed (e.g., within a container 116). Any of a variety of triggers, events, etc. may be specified by the user to cause the user code 124 to be executed.

In embodiments in which containers 116 are created within a virtual machine instance 111 for execution of user code 120, such virtual machine instances may be selected from the warming pool 130 of virtual machine instances 132. The warming pool 130 includes a manager that ensures the virtual machine instances 132 are ready to be used when needed for execution of, for example, user code 120. The virtual machine instances 132 of the warming pool 130 comprise a group of pre-initialized and pre-configured virtual machine instances that may be used to service incoming user code application requests.

In some examples, a client device 170 may submit a request to the service provider network 100 for an action to be performed. The request may be in the form of, for example, an API call, although the request may be in other forms as well. The request may be routed through the edge router 107 and internal network 105 to the service 126 targeted by the request. The request may entail multiple operations to be performed. The service 126 that receives the incoming request may perform all of the operations to fully handle the request, or perform one or more (but not all) of the operations. In the latter case, the service 126 that receives the incoming request submits one or more requests to another service 126 (or multiple services). Some of the operations may be performed by the user code 120, 124.

One or more of the services 124 and user codes 120, 124 may execute in a stateless environment. Such services and codes may not store any state between their invocations. Consequently, debugging the behavior of services and codes may be problematic. In accordance with various embodiments, a data flow token (DFT) is generated and assigned to an incoming invocation request from a client device 170 to a service 126 or user code 120, 124. A data flow token may be a platform-level data-structure that propagates across service boundaries. In some examples, the data flow token is an immutable universally unique identifier that may be included, for example, in an HTTP header. For example, a particular service 126 may receive a request from a client device in the form of an API call. DFT code 122 associated with the receiving service 126 analyzes the HTTP header associated with the incoming API call to determine whether the header includes a data flow token. If no data flow token is detected, the DFT code 122 generates a data flow token for the API call and embeds the newly generated data flow token in a packet header (e.g., HTTP header) that the receiving service 126 sends to another service 126 or user code 120, 124. An incoming API call from a client device 170, which may be received by one service 126 or user code 120, 124, may cause a chain reaction of packets to be sent to other services 126 or user codes 120, 124. For example, one service may call another service which may call yet another service in a sequential series of calls, while in other examples, one service may issue calls to two or more other services or user codes concurrently. DFT code 122 associated with each such service or user code generally performs the same operations, which is to determine whether the incoming call includes a data flow token, and to generate a data flow token if one is not present. The DFT code 122 may be a component of, or accessible to, the network stack of the service or user code.

Whether a data flow token is present in the incoming packet received a service 126 or user code 120, 124 or the associated DFT code generates a new data flow token, the DFT code 122 generally performs at least two actions in some embodiments. One action is to embed the data flow token in any packets sent to other services or user codes to perform operations in furtherance of the performance of the original API call received from a client device 170. Another action is to write an entry in a diagnostics log 140. Each such diagnostics log entry may include the data flow token and a time stamp. The time stamp may be the time at which the respective service or user code received the packet (e.g., API call). The time stamp is thus generated locally by the computing device 110 that executes the service or user code. In some examples, a separate diagnostics log 140 is mapped to each service 126 or user code 120, 124. In such cases, each diagnostics log 140 contains diagnostics records generated by the DFT code 122 of one particular service or user code.

Figure 2:
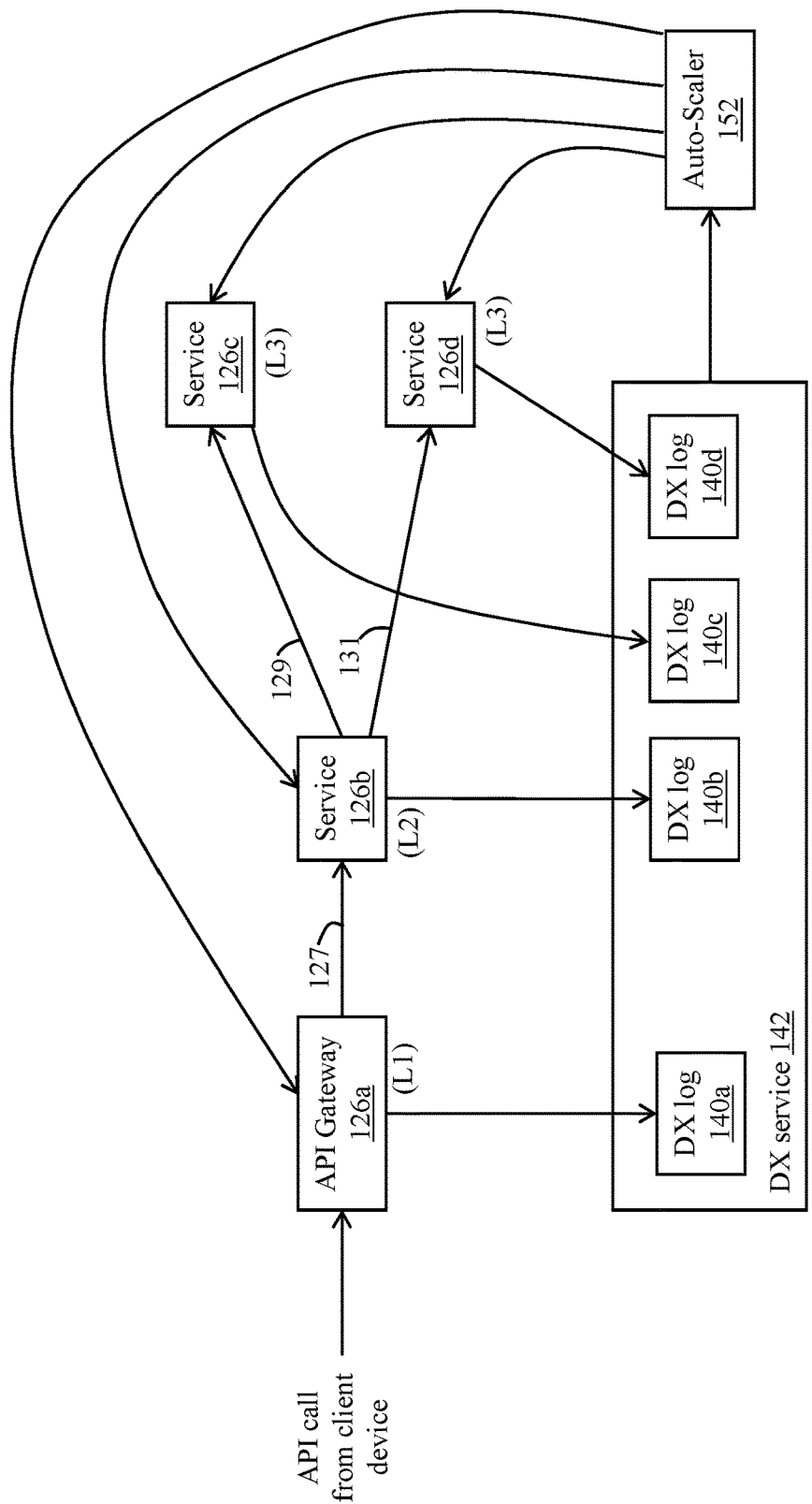
FIG. 2 illustrates an example of a hierarchy of executable functions and an auto-scaler in accordance with various examples.

FIG. 2 shows an example of an embodiment of the service provider network 100. An API call is generated by a client device 170 and transmitted to a service 126*a* that implements an API gateway. The API gateway 126*a* processes the incoming API call to perform any of a variety of operations. For example, a user of the service provider may expose certain APIs to the external network that map to service provider internal APIs. The API gateway 126*a* thus may include a data store of mappings that map externally exposed APIs to internally implemented APIs. The API gateway 126*a* thus may determine whether a mapping exists for an incoming API call and, if a mapping does exist, to invoke the corresponding API(s) for transmission internally to the service provider network. In the example of FIG. 2, the API gateway 126*a* responds to the receipt of the API call from the client device by sending a packet 127 to service 126*b*. Service 126*b*, in turn, responds to receipt of its packet from the API gateway 126*a* by sending packets to each of services 126*c* and 126*d* (as indicated by arrows 129 and 131, respectively).

The services 126*b*, 126*c*, and 126*d* may perform any of a variety of operations. For example, service 126*b* may cause user code 120, 124 to be invoked. The user code is provided by the user and performs whatever operations the user so desires. In some embodiments, the user code may be invoked by initiating a container 116 to run the user code therein (user code 120). Services 126*c* and 126*d* may provide database services, streaming services, and other types of services that the service provider desires for the service provider network to offer to its users. The API call received by the API gateway 126*a* from the client device thus results in multiple services 126 being invoked to perform portions of the operations needed to implement the original API call. The original API call from the client device does not have a data flow token. The API gateway 126*a* generates a data flow token and embeds it in the packet transmitted to service 126*b*. Service 126*b*, in turn embeds the same data flow token in the packets 129, 131 transmitted to services 126*c* and 126*d*. Thus, in some examples, each packet generated to implement a portion of the original API call from the client device may include the same data flow token. The data flow defined by the invocations of the various services 126 to implement an API call from a client device is identified by a unique data flow token.

Each service 126*a*-126*d* may be mapped to a separate diagnostic log 140. In the example of FIG. 2, the diagnostics logs 140 are part of a diagnostics service 142 that may be executed on a computing device 110. The diagnostics logs may be stored in non-volatile storage of that computing device or on storage devices accessible to the computing device on which the diagnostics service 142 executes. The API gateway service 126*a* may map to diagnostics log 140*a*. The service 126*b* may map to diagnostics log 140*b*. The service 126*c* may map to diagnostics log 140*c*, and the service 126*d* may map to diagnostics log 140*d*. In other embodiments multiple services may be mapped to a common diagnostics log, rather than separate logs.

Each diagnostic log 140*a*-140*d* can be used to store log data from the respective service 126*a*-126*d*. Each diagnostic log 140 may contain multiple entries and each entry may include diagnostics-related data from the respective service, or the DFT code 122 associated with the respective service. In some embodiments, a service 126a-126d may write two entries to its respective diagnostics log 140a-140d upon processing of a given packet (e.g., API). One entry in the diagnostics log may be written upon initial receipt by the service of the incoming API. Another entry is written upon completion of the task perform by the service. The diagnostics data written into the diagnostics log 140 at the beginning and end of the execution of the API by the service 126 may be written into two different entries in the diagnostics log or into one common entry.

The diagnostics data written into the diagnostics log by DFT code 122 may include the data flow token of the respective API and the time stamp. The data may also include the data payload of the packet received by the respective service. The time stamp may include the time at which the service received the API call as well as the time at which the service completed execution of the API. The difference between the two time stamps corresponds to the elapsed time required for the service to complete the execution of the API call. The data flow token establishes an identifier for the data flow of a given API call originally received by the API gateway 126a. The records contained in the various diagnostics logs 140a-140d can be analyzed to identify records having a common data flow token. A set of records having the same data flow token represents operations performed by the various services resulting from receipt by a single API call by the API gateway 126a and thus represent part of the same data flow.

The auto-scaler 152 can retrieve the records from the various diagnostics logs 140a-140d and use the beginning and ending time stamps in the records of each service 126 to compute the elapsed time that each service took to complete its task(s). Based on the elapsed time determined by the auto-scaler 152 for each service to complete its task, the auto-scaler 152 can determine whether a performance parameter of any of the services 126a-126d should be adjusted. For example, if one of the services took more than a threshold amount of time to complete its task, the auto-scaler 152 may adjust a performance parameter of that service to increase its speed of operation. For example, an additional resource may be provided for use by that service, such as additional memory (i.e., a memory allocation), additional processing power (i.e., a processor allocation), etc. By way of additional examples, a change (e.g., increase) can be made to a number of input/output (I/O) operations per unit of time (e.g., IOPS-I/O per second), the number of transactions per unit of time, or the number of invocations of a service per unit of time can be implemented. A further explanation of the operation of the auto-scaler 152 is provided below.

Figure 3:
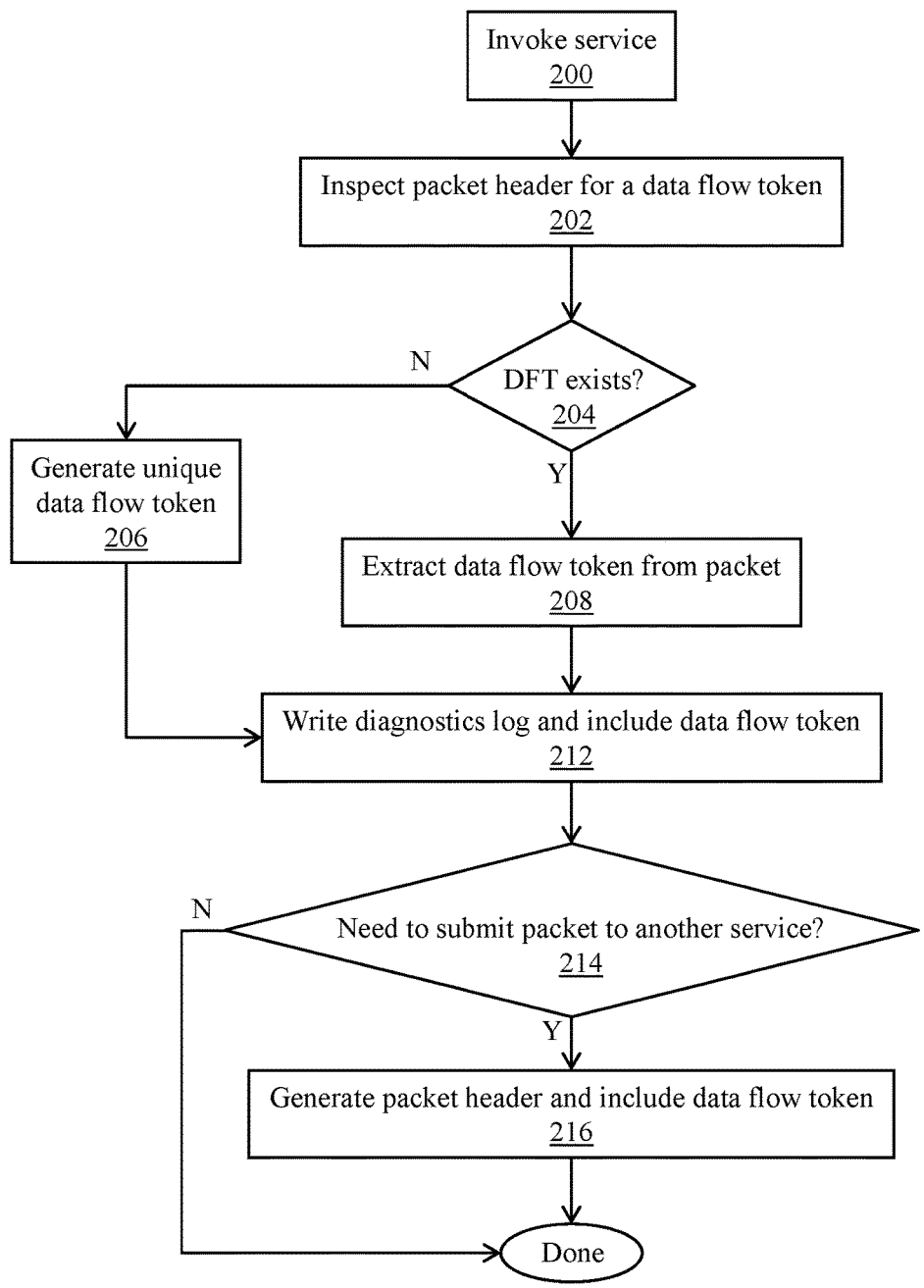
FIG. 3 illustrates a flow chart of a method for using data flow tokens in accordance with various examples.

FIG. 3 shows a flow chart of a method in accordance with various embodiments. The operations shown in FIG. 3 can be performed in the order shown, or in a different order. Further, two or more of the operations may be performed concurrently rather than sequentially. At 200, the method includes invoking a service 126. This operation may be performed by a client device 170 (FIG. 1) issuing, for example, an API call to a service 126 or user code 120, 124 within the service provider network 100. The edge router 107 of the network 100 receives the API call and the API call is then routed through the internal network 105 to a computing device 110 executing the service or user code targeted by the API call. DFT code 122 associated with the service performs operations 202-216.

At 202, the DFT code 122 inspects the header of the packet corresponding to the API call. In some embodiments, the HTTP header is inspected. The DFT code 122 inspects the header (e.g., HTTP header) to determine at 204 whether a data flow token is present in the header. A data flow token may be detected by examination of a predetermined character string within the header. For example, the predetermined character string may be "DataflowToken." If that particular character string is discovered, then the data flow token is present in the header and may precede or follow the predetermined character string that identifies the presence of the token.

At 206, if no data flow token is discovered in the packet header, then the DFT code 122 generates a unique data flow token. In some embodiments, generation of a data flow token may include an auto-generated alphanumeric character string. The character string may be a randomized character string of a predetermined length, an integer value (e.g., incremented version of a previously used token), a non-randomized character string, or any other type of unique identifier for the data flow. However, if a data flow token is discovered in the packet header at 204, then at 208, the method includes extracting the data flow token from the packet.

Either way (for a data flow token generated from scratch or extracted from the packet), the method includes at 212 writing diagnostics data to a diagnostics log 140 corresponding to the service that received the packet. This operation may comprise the DFT code 122 directly writing to the corresponding diagnostics log, or causing such a write transaction to occur. In some embodiments, the DFT code 122 sends a packet across the internal network 105 to the diagnostics service 142 to request data to be stored in a particular diagnostics log. The diagnostics service receives the packet and may respond by updating the respective diagnostics log.

In some embodiments, the diagnostics log includes the data flow token generated at 206 or extracted at 208 as well as the time stamp corresponding to the time that the service received the packet to invoke the service at 200. The time stamp may include a time of day, a date and a time of day, or any other value that is indicative of time.

The DFT code 122 also may generate an identifier of the service that received the packet at 200 and include the identifier with the data flow token and time stamp as well. In such embodiments, the diagnostics data thus may include the data flow token, the time stamp, and the service identifier. In embodiments in which the auto-scaler 152 or other components recreates the data flow of a given initial API call from the diagnostics logs, the recreation of the data flow may be based at least on the data flow tokens and the time stamps. For example, all diagnostic log records having the same data flow token are considered to be part of the same data flow. The time stamps at which each service received an incoming packet as part of the data flow can be used to determine the order at which the various services of the data flow were invoked. However, clock skew between computing devices 110 on which the various services execute may cause the services to be determined to have occurred in an incorrect order. The clock skew may result from the clocks of different computing devices to be slightly off from one another. That timing difference may be large enough to determine an incorrect service invocation order.

To address this potential problem, the DFT code 122 may generate and embed a unique service identifier in a packet that the service transmits to another service in the data flow. The service identifier may be added to the data flow token as a form of a "caller ID." The service identifiers included in the data flow tokens then can be used to determine the order at which the various services were invoked during the data flow. The time stamps would not be needed for this purpose in such embodiments, but may still be used to determine the elapsed time spent by each service to complete its operation(s).

Referring still to FIG. 3, at 214 the service, which was invoked at 200 and for which the data flow token was generated at 206 or extracted at 208, determines whether it needs to submit a packet to another service. For example, the API gate 126a of FIG. 2 sends a packet 127 to the service 126b, and the service 126b sends packets 129 and 131 to services 126c and 126d to implement additional portions of the overall data flow initiated by the original API packet transmitted by a client device 170. Such packets are transmitted in accordance with the logic implemented by the source service. If at 214 the service determines that a packet needs to be sent to another service, the source service (e.g., its network stack) generates a packet header and includes the data flow token in the header at 216. The data flow token may be embedded in, for example, the HTTP header of the packet as explained above. The packet them may be transmitted to the destination service.

Each of the services along a data flow executes the same logic identified in FIG. 3. The initial service in the data flow generates a data flow token as the initial packet received by that service will not already have a data flow token. The remaining services along the data flow extract the data flow token from their incoming packets, and embed the extracted data flow token in outgoing, downstream packets. The records added to the diagnostics logs are added by the DFT code 122 that is built into the service provider network 100. That is, the user's own code (e.g., user code 120, 124), need not be burdened with detecting whether data flow tokens are present in incoming packets, generating data flow tokens, writing diagnostics data to the diagnostics service 142, etc. Instead, service provider network tools such as the DFT code 122 perform such operations. In fact, the client device 170 that submits the API call to the service provider network 100 as well as the service provider user whose user code 120, 124 and user paid for services 126 may be unaware that the service provider network has instrumented the packets of the data flow with data flow tokens and stored related diagnostic data in the diagnostic logs 140.

The diagnostics data stored in the diagnostics logs 140 can be analyzed for any of a variety of reasons. For example, the diagnostics log data can be analyzed to "recreate" a given data flow. Recreating a data flow refers to identifying the various services that were invoked in response to receipt of an API call from a client device. The order by which such services were invoked during the data flow also can be determined based on the time stamps and/or service provider identifiers as described above.

Figure 4:
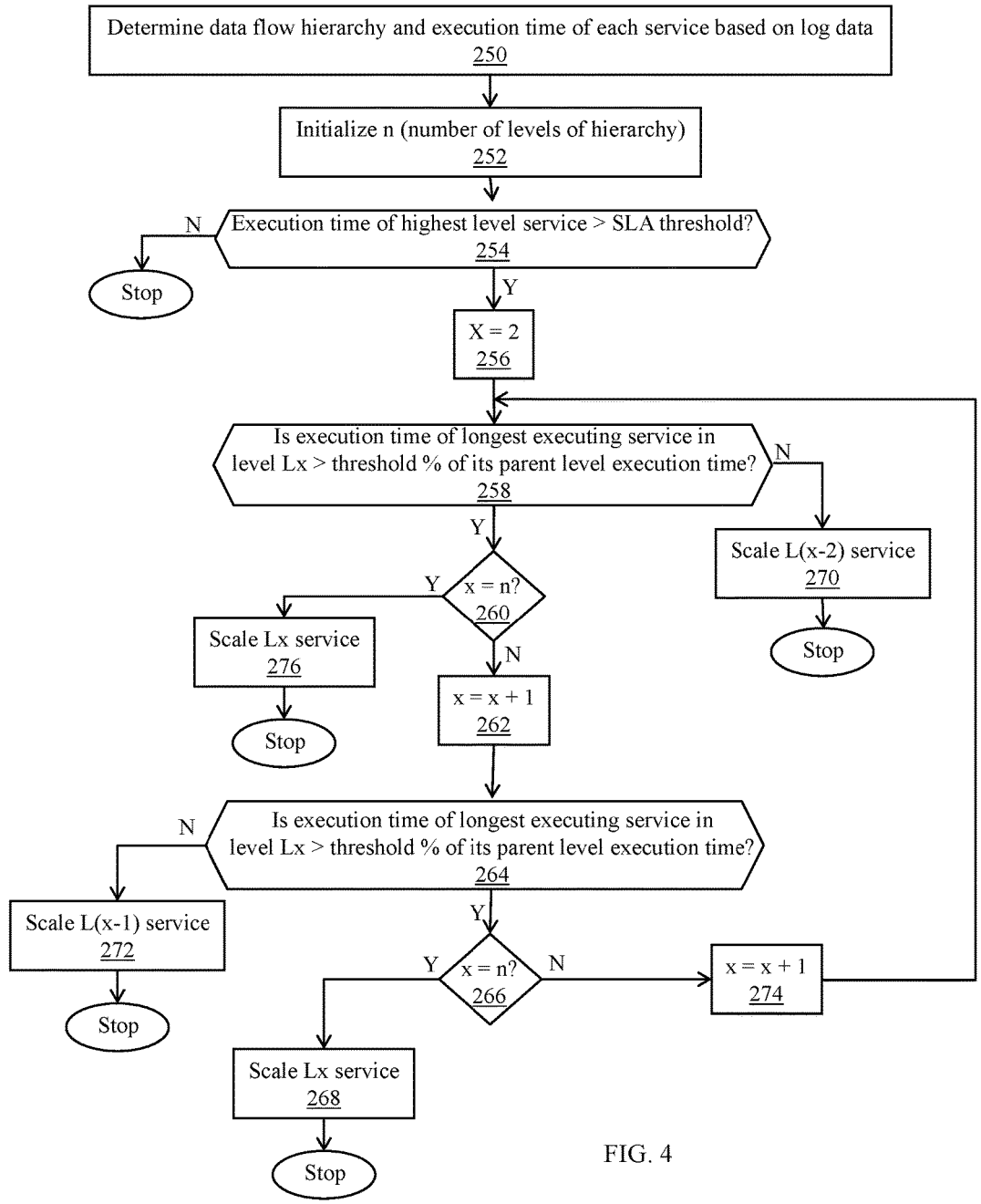
FIG. 4 illustrates a flow chart of a method for auto-scaling a provider network in accordance with various examples.

FIG. 4 illustrates an embodiment of a method for analyzing the data of the diagnostics logs 140 and using such data to auto-scale one or more of the services 126. The operations shown in FIG. 3 can be performed in the order shown, or in a different order. Further, two or more of the operations may be performed concurrently rather than sequentially. The auto-scaler 152 may perform the operations illustrated in FIG. 4.

At 250, the method includes determining the data flow data flow hierarchy and execution time of each service within the hierarchy based on the diagnostics log data. This operation may include retrieving records from the diagnostics logs 140. The records retrieved may be records that were created over a specified period of time (e.g., within the last 24 hours). The records retrieved may include multiple different data flow tokens. Records with different data flow tokens contain diagnostic data corresponding to different data flows. The records across the various diagnostics logs 140 can be processed by the auto-scaler 152 to determine which services called which services. For example, with respect to the illustrative data flow hierarchy depicted in FIG. 2, the auto-scaler 152 would determine from the diagnostics log data (e.g., based on the time stamps or based on service identifiers included with the data flow tokens) for a given data flow token that the API gateway 126a called service 126b, which in turn called both services 126c and 126d. Service 126a is deemed to be at the highest level of the hierarchy (level L1 as denoted in parentheses in FIG. 2), and services 126c and 126d are at the lowest (level L3). Service 126b is at the middle level (L2) of the hierarchy.

The time stamps within the diagnostics logs 140 also can be used to determine the amount of time that each service took to execute. In some embodiments, a first time stamp is recorded into the service's diagnostics log 140 indicative of the time at which the service received the incoming packet (e.g., API), and a second time stamp is recorded upon termination of that service's execution of the API. In some examples, an upstream service receives a packet, performs one or more operations, and requests a downstream service to perform an operation as well. The downstream service receives a packet from the upstream service and performs the required operation(s). Upon completion of the operation, the downstream service may send a packet to the upstream service that the downstream service has completed its operation. While the downstream service performs its operation, the upstream service may or may not be performing any of its own operations. For example, the upstream service may simply be waiting for the downstream service to complete its task. At any rate, once the upstream service receives an indication of the task completion from the downstream service (and assuming the upstream service has no further operations to perform), DFT code 122 of the upstream service writes an additional entry of the diagnostics log 140 with a time stamp corresponding to the time that the upstream service's operations are now complete.

The elapsed time between the initial and ending time stamps for the upstream service thus includes time spent by the upstream service actively perform one or more operations, as well as the time spent by the downstream service performing an operation at the request of the upstream service. The periods of time spent by each of the upstream and downstream services may run concurrently, or may overlap. The auto-scaler 152 may subtract the initial time stamp from the ending time stamp for a given service to determine how long that service took to complete its operation(s).

A user may have selected or paid for a particular service level agreement (SLA) by which each API submitted by a client device is to be executed in less than a predetermined period of time (e.g., less than 100 milliseconds). That is, to the extent that an incoming API to the service provider network requires execution by multiple services 126, the time from the initial invocation of the first of such services 126 to the completion of the last of such services should be less than the prescribed SLA period of time. In other embodiments, the service provider has guaranteed that the APIs will be executed in less than the SLA period of time, and the service provider user does not select the period of time.

If a given API takes more than the prescribed period of time, then the auto-scaler may determine how to tune the network to thereby cause future invocations of the API to execute with the prescribed period of time. For a given data flow for which the total time took more than the SLA period of time, the auto scaler determines the data flow hierarchy and the elapsed time spent by each service at 250. The auto-scaler 152 then executes some or all of the rest of the operations in the example of FIG. 4 to determine how to adjust the performance of one of the services of the data flow hierarchy.

At 252, the method includes initializing a variable n to equate to the number of levels of the data flow hierarchy. For example, in the example of FIG. 2, the number of levels of the data flow hierarchy is 3, and thus n in that example would be set to a value of 3. The value of n is used to determine when the entire hierarchy of the data flow has been analyzed.

As noted above, an SLA period of time (an "SLA threshold") represents the maximum amount of time that an API is permitted to take to fully execute. At 254, the method includes determining whether any service at the highest level of the data flow hierarchy has an execution time that is greater than the SLA threshold. Because in the disclosed embodiments the execution time of all downstream services are tracked as part of the execution time of their upstream parent services, if there are no services at the highest hierarchy level that exceed the SLA threshold, then the entire API execution time is determined to be less than the SLA threshold, and he method stops.

However, if any of the services at the highest hierarchy level takes longer than the SLA threshold to execute, then the method continues at 256 at which an index value x is initialized to 2. At 258, the execution time of the services at the next lowest hierarchy level Lx (which is level L2 as x has been initialized to the value 2) is analyzed. The method determines whether the execution time of the longest executing service at the L2 level is greater than a threshold percentage of its parent level execution time. The threshold percentage may be predefined or programmable. In some cases, the threshold percentage may be 70%. With reference to the example of FIG. 2, the method determines whether the execution time of service 126b is greater than 70% of the execution time of the API gateway service 126a.

For purposes of illustrating the method depicted in FIG. 4, assume that the level L3 service 126c of FIG. 2 took much too long to execute and thereby caused the entire API data flow to exceed the defined SLA threshold. At operation 254, the method determines that the execution time of the API gateway service 126a exceeded the SLA threshold. At 258, the method further determines that the level L2 service 126b took more than the threshold percentage of its parent level (service 126a) execution time. At this point, it is known a service should be scaled, but because service 126b took longer to execute than the threshold percentage of the execution time of service 126a, service 126a need not be scaled. Instead either service 126b or one of its downstream services should be scaled instead.

The method continues at 260 at which it is determined whether the index value x equals n. The value of x and n are currently 2 and 3, respectively, and thus x does not equal n thereby indicating that the lowest level of the hierarchy has not been analyzed yet. The method then continues at 262 by incrementing the index value of x by 1. At this point, x now equals 3.

At 264 the method performs a similar determination as at 258. Specifically, the method analyzing the execution time of the service(s) at the hierarchy level Lx (which is level L3 as x has been incremented to the value 3). The method determines whether the execution time of the longest executing service at the L3 level is greater than a threshold percentage of its parent level (L2) execution time. In the example set forth above, the method determines that the execution time of service 126c is greater than the threshold percentage (e.g., 70%) of the execution time of parent service 126b. Control flows to 266 at which it is determined whether x equals n. The value n was initialized to 3 at operation 252, and x has been incremented to 3. Therefore, x equals n and thus at 268, the auto-scaler scales the service at level L3 (e.g., service 126c) at 268.

Returning to operation 258 (at which x equals 2), if instead of the level L3 service 126c taking too long to execute, the level L1 service 126a took too long to execute for its own processing activity (and not the result of downstream execution time slowness), then the auto-scaler 152 determines that the execution time of the level L2 is not greater than the percentage threshold of the parent execution time of the L1 level (service 126a). Control then moves to operation 270 at which the auto-scaler scales the L(2-1), or L(1), service 126a.

By way of another example, assume that level L3 services 126c and 126d do not take long to execute, but that the level L2 service 126b does take a substantial amount of time to execute. The first time that operation 258 is performed (with x=2), the method determines that the level L2 service took longer to execute than the threshold percentage of its parent execution time. Control flows to 260 at which it is determined that x does not equal n and then at 262, x is incremented to a value of 3. At 264, the method determines that the execution time of the L3 service 126c,d is not greater than the threshold percentage of its parent (L2) execution time. Therefore, at 272 the auto-scaler 152 scales the L(3-1), or L(2), service 126b.

At 266, it may be determined that x still does not equal n (which would be the case for a four level hierarchy), at which point x is again incremented and control loops back to 258. If, at 260, the auto-scaler determines that x equals n and per 258 it is determined that the Lx level took longer than the threshold percentage of its parent level to execute, then at 276, the auto-scaler scales the Lx service.

The auto-scaler 152 may scale a service in accordance with a variety of embodiments. For example, a particular service may be configured to receive a configuration parameter that causes the service to operate at a higher or lower performance level. Some services may operate at a higher performance level with an increased amount of memory at the disposal, and thus the auto-scaler 152 may scale the service by transmitting a new memory configuration parameter to the service. By way of an additional example, a service may be configurable to have a different number of processors operating to perform the service. Such services may be configurable by the auto-scaler configuring a particular number of processors to be used by the service. In some embodiments, the auto-scaler directly scales the service (i.e., programs the service with a new configuration parameter). In other embodiments, the auto-scaler may request that the service change its performance level to a higher setting, and the service configures itself accordingly.

As noted previously, in some embodiments the service provider network may include asynchronous data processing architecture patterns that are based on polling and data change triggers or events, where data may be held for an arbitrary period of time before continuing on to the next execution of the data flow. An example of such a service may be a storage service or streaming service, but numerous other examples exist as well. A storage service may store a data object and then trigger an event for a further operation to be performed on the data object.

For example, an application executed on a mobile device (e.g., smart phone) may obtain and upload a digital photograph to a photo storage service on the service provider network. The storage service may generate a data flow token for the received data object (e.g., photograph), if the packet containing the incoming data object does not already have a data flow token, and store the data flow token along with the data object. The storage service may have the ability to store data objects as well as metadata associated with the data objects. The storage service may persist the data flow token by, for example, creating a metadata property and setting the value of the newly created metadata property to the newly generated data flow token. The data flow token will then be stored as part of the normal storage behavior of the storage service.

Further, storage of the data object (e.g., photograph) may cause the storage service to generate an event. The event may trigger a downstream service to take further action on the newly stored data object. The event may take on a variety of forms such as a JSON object. The event generated by the service may include the data flow token within the event itself (e.g., the JSON object). The event consumer (i.e., the downstream service that receives and reacts to the event) then has access to the data flow token and may continue to propagate the data flow token as explained previously.

Figure 5:
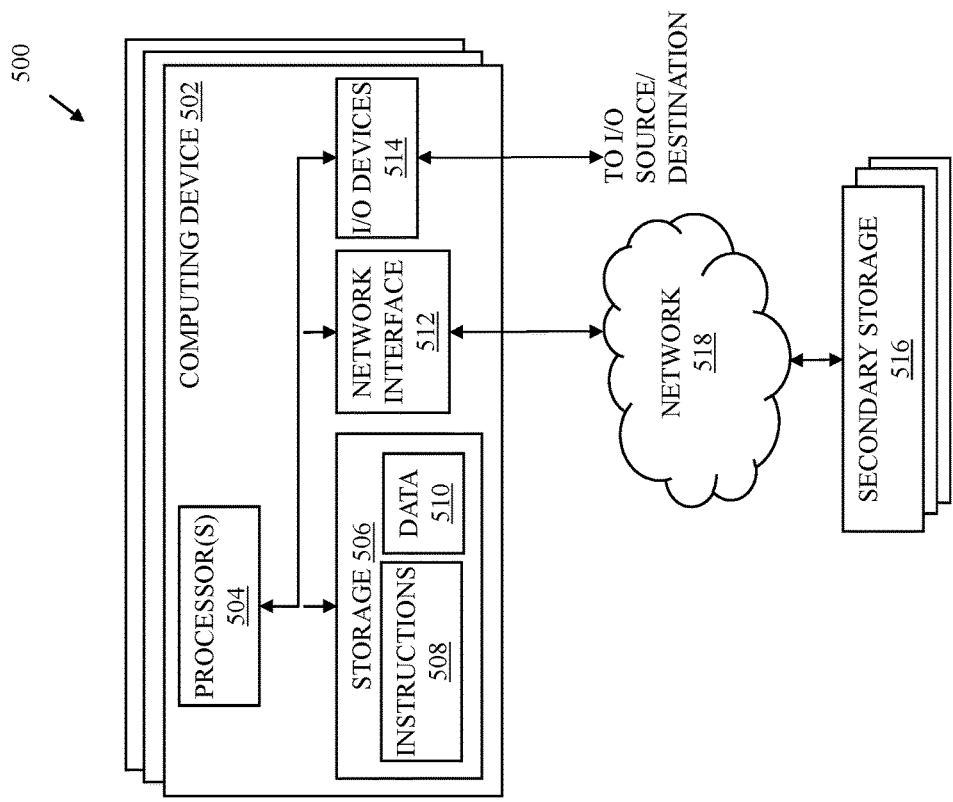
FIG. 5 shows a block diagram of a computing device in accordance with various examples.

FIG. 5 shows a schematic diagram for a computing system 500 suitable for implementation of the operating systems 112, runtimes 114, various services 126, user codes 120, 124, virtual machine instances, containers 116, diagnostics logs 140, and auto-scaler 152 in accordance with various embodiments. The system includes one or more computing devices 502. The computing system 500 includes the computing devices 502 and secondary storage 516 communicatively coupled together via a network 518. One or more of the computing devices 502 and associated secondary storage 516 may be used to provide the functionality of the operating systems 112, runtimes 114, various services 126, user codes 120, 124, virtual machine instances, containers 116, diagnostics logs 140, and auto-scaler 152.

Each computing device 502 includes one or more processors 504 coupled to f emote 506, network interface 512, and I/O devices 514. In some embodiments, a computing device 502 may implement the functionality of more than one component of the system 100. In various embodiments, a computing device 502 may be a uni processor system including one processor 504, or a multiprocessor system including several processors 504 (e.g., two, four, eight, or another suitable number). Processors 504 may be any suitable processor capable of executing instructions. For example, in various embodiments, processors 504 may be general-purpose or embedded microprocessors implementing any of a variety of instruction set architectures ("ISAs"), such as the x86, PowerPC, SPARC, or MIPS ISAs, or any other suitable ISA. In multiprocessor systems, each of processors 504 may, but not necessarily, commonly implement the same ISA. Similarly, in a distributed computing system such as on that collectively implements the operating systems 112, runtimes 114, various services 126, user codes 120, 124, virtual machine instances, containers 116, diagnostics logs 140, and auto-scaler 152, each of the computing devices 502 may implement the same ISA, or individual computing nodes and/or replica groups of nodes may implement different ISAs.

The storage 506 may include a non-transitory, computer-readable storage device configured to store program instructions 508 and/or data 510 accessible by processors 504. The storage 506 may be implemented using any suitable volatile memory (e.g., random access memory), non-volatile storage (magnetic storage such as a hard disk drive, optical storage, solid storage, etc.). Program instructions 508 and data 510 implementing the functionality disclosed herein are stored within storage 506. For example, instructions 508 may include instructions that when executed by processor's) 504 implement the operating systems 112, runtimes 114, various services 126, user codes 120, 124, virtual machine instances, containers 116, diagnostics logs 140, and auto-scaler 152 disclosed herein.

Secondary storage 516 may include additional volatile or non-volatile storage and storage devices for storing information such as program instructions and/or data as described herein for implementing the various aspects of the service provider's network described herein. The secondary storage 516 may include various types of computer-readable media accessible by the computing devices 502 via the network 518. A computer readable medium may include storage media or memory media such as semiconductor storage, magnetic or optical media, e.g., disk or CD/DVD-ROM, or other storage technologies. Program instructions and data stored on the secondary storage 516 may be transmitted to a computing device 502 for execution by a processor 504 by transmission media or signals via the network 518, which may be a wired or wireless network or a combination thereof. Each of the resource instance manager 180 and interface manager 183 and other components described herein may be implemented as a separate computing device 502 executing software to provide the computing node with the functionality described herein. In some embodiments, the resource instance manager 180, interface manager 183, and other components may be implemented by the same computing node.

The network interface 512 may be configured to allow data to be exchanged bet wen computing devices 502 and/or other devices coupled to the network 518 (such as other computer systems, communication devices, input/output devices, or external storage devices). The network interface 512 may support communication via wired or wireless data networks, such as any suitable type of Ethernet network, for example; via telecommunications/telephony networks such as analog voice networks or digital fiber communications networks; via storage area networks such as Fibre Channel SANs wireless telecommunication networks, or via any other suitable type of network and/or protocol.

Input/output devices 514 may include one or more display terminals, keyboards, keypads, touchpads, mice, scanning devices, voice or optical recognition devices, or any other devices suitable for entering or retrieving data by one or more computing devices 502. Multiple input/output devices 514 may be present in a computing device 502 or may be distributed on various computing devices 502 of the system 500. In some embodiments, similar input/output devices may be separate from computing device 502 and may interact with one or more computing devices 502 of the system 500 through a wired or wireless connection, such as over network interface 512. It will be appreciated by those skilled in the art and others that all of the functions described in this disclosure may be embodied in software executed by one or more physical processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storage medium storing the computer executable components such as a CD-ROM, DVD-ROM, or network interface. Further, the component and/or data can be included in a single device or distributed in any manner. Accordingly, general purpose computing devices may be configured to implement the processes, algorithms, and methodology of the present disclosure with the processing and/or execution of the various data and/or components described above.

References to "based on" should be interpreted as "based at least on." For example, if a determination of a value or condition is "based on" a value of Y, then the determination is based at least on the value of Y; the determination may be based on other values as well.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system for auto-scaling services of a network, comprising:
   one or more hardware computing devices, each hardware computing device including a processor and memory, the memory including machine instructions that are executable by the respective processor, wherein, upon executing the machine instructions, the one or more hardware computing devices are configured to:
   retrieve records from a plurality of diagnostics logs, each log corresponding to one of a plurality of services configured to execute on the network, each record including a data flow token that uniquely identifies a data flow through multiple services and a time stamp;
   recreate a data flow from the data flow tokens and the time stamps;
   based on the time stamps, determine an amount of time that each of the multiple services executed in the recreated data flow;
   determine that the amount of time at least one service executed in the recreated data flow is greater than a threshold time value; and
   adjust a performance parameter of the at least one service that executed for an amount of time greater than the threshold time value.

2. The system of claim 1, wherein the multiple services of the recreated data flow includes a first service that called a second service, and wherein the hardware computing devices are configured to:
   determine that each of the first and second services executed for an amount of time greater than the threshold time value, and
   adjust the performance parameter of the second service.

3. The system of claim 1, wherein the multiple services of the recreated data flow includes a first service that called a second service, and wherein the hardware computing devices are configured to determine that the amount of time executed by the second service is greater than a threshold percentage of the amount of time executed by the first service and to adjust the performance parameter of the second service.

4. The system of claim 1, wherein the hardware computing devices are configured to adjust the performance parameter of the at least one service through a change of a configuration of the at least one service to use additional resources.

5. A system, comprising:
   one or more hardware computing devices, each hardware computing device including a processor and memory, the memory including machine instructions that are executable by the respective processor, wherein, upon executing the machine instructions, the one or more hardware computing devices are configured to:
   inspect an incoming packet for a data flow token;
   determine that the dataflow token is present in the incoming packet and extract the data flow token from the incoming packet;
   write an entry to a diagnostic log, the entry including the data flow token and a time stamp; and
   form an outgoing packet and embed the data flow token in the outgoing packet.

6. The system of claim 5:
   wherein upon executing the machine instructions, the or more hardware computing devices are configured to include with the data flow token an identifier of a first executable service that received the incoming packet; and
   wherein the entry to the diagnostic log includes the identifier.

7. The system of claim 6, wherein upon executing the machine instructions, the one or more hardware computing devices are configured to embed the identifier in the outgoing packet.

8. The system of claim 6, wherein the identifier includes an alphanumeric name of the service.

9. The system of claim 6, wherein upon executing the machine instructions, the one or more hardware computing devices are configured to:
   detect a value in the incoming message, the value associated with a second executable service that called the first executable service; and
   increment the value to generate the identifier of the first executable service.

10. The system of claim 5, wherein upon executing the machine instructions, the one or more hardware computing devices are configured to:
retrieve records from a plurality of diagnostics logs, each log corresponding to one of a plurality of services configured to execute on a service provider network, each record including a data flow token that uniquely identifies a data flow through multiple services;
recreate a data flow among the multiple services from the data flow tokens;
determine an amount of time that each of the multiple services executed in the recreated data flow;
adjust a performance parameter of a service of the multiple services that executed for an amount of time greater than a threshold time value.

11. The system of claim 10, wherein each record also includes a time stamp, and upon executing the machine instructions, the one or more hardware computing devices are configured to recreate the data flow form the data flow tokens and the time stamps.

12. The system of claim 10, wherein each record of each of the diagnostic logs includes also includes an identifier of the service of the respective diagnostic log, and upon executing the machine instructions, the one or more hardware computing devices are configured to recreate the data flow form the data flow tokens and the service identifiers.

13. The system of claim 10, wherein the multiple services of the recreated data flow includes a first service that called a second service, and wherein the hardware computing devices are configured to:
determine that the first service executed for an amount of time greater than the threshold time value;
determine that the second service executed for an amount of time that is greater than a threshold percentage of the amount of time executed by the first service; and
adjust the performance parameter of the second service.

14. The system of claim 5, wherein the one or more hardware computing devices are configured to determine that the data flow is not present in the incoming packet and to generate the data flow token.

15. A method, comprising:
from multiple records of a diagnostics log service, determining an order by which a plurality of services of a service provider network executed in a data flow initiated by an application programming interface call;
determining an amount of time each of the plurality of services executed; and
adjusting a configuration parameter of a service, from among the plurality of services, that executed for a period of time in violation of a threshold value.

16. The method of claim 15, further comprising:
writing the diagnostics log service by each of the plurality of services with a data flow token and a time stamp; and
wherein determining the order includes identifying records that have the same data flow token and using the time stamps of the identified records to determine the order of the plurality of services.

17. The method of claim 16, wherein writing the diagnostics log service by each of the plurality of services with a data flow token and a time stamp includes writing the diagnostics log service with a first time stamp upon invocation of the respective service and a second time stamp upon completion of the respective service, and wherein determining the amount of time each of the plurality of services executed comprises subtracting the first and second time stamps.

18. The method of claim 16, further comprising:
determining that a packet received by one of the plurality of services does not include the data flow token; and
generating the data flow token.

19. The method of claim 15, further comprising receiving a data object, creating a data flow token, creating a metadata property, setting a value of the metadata property to the data flow token, storing the metadata property and the data flow object to a persistent storage, and generating an event that includes the data flow token.

20. The method of claim 15, wherein:
the threshold value is a percentage threshold and the determined order includes a hierarchy of services including an upper level including a first service and a lower level including a second service;
the method further includes determining whether the second service in the lower level executed for more than the percentage threshold of an execution time of the first service in the upper level;
adjusting the configuration parameter includes adjusting the configuration parameter of the second service based on the second service executing for more than the percentage threshold; and
adjusting the configuration parameter includes adjusting the configuration parameter of the first service based on the second service executing for less than the percentage threshold.

21. The method of claim 15, wherein adjusting the configuration parameter includes adjusting at least one of a memory allocation, a processor allocation, a number of input/output operations per unit of time, a number of transactions per unit of time, and a number of service invocations per unit of time.

* * * * *